(12) United States Patent
Herbst et al.

(10) Patent No.: US 6,907,499 B2
(45) Date of Patent: Jun. 14, 2005

(54) INTERRUPTING DISC WRITE OPERATIONS TO SERVICE READ COMMANDS

(75) Inventors: James Arthur Herbst, Longmont, CO (US); Steven Scott Williams, Longmont, CO (US); Bradley Ronald Brookes, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 370 days.

(21) Appl. No.: 10/198,894

(22) Filed: Jul. 18, 2002

(65) Prior Publication Data

US 2003/0145165 A1 Jul. 31, 2003

Related U.S. Application Data

(60) Provisional application No. 60/353,699, filed on Jan. 31, 2002.

(51) Int. Cl.[7] ............................................. G06F 12/00
(52) U.S. Cl. .................... 711/112; 711/111; 711/113; 711/154; 710/6; 710/43; 360/78.07
(58) Field of Search ..................... 711/112, 111, 113, 711/154; 710/6, 43; 360/78.07

(56) References Cited

U.S. PATENT DOCUMENTS

| | | | |
|---|---|---|---|
| 5,353,430 A | 10/1994 | Lautzenheiser | 711/117 |
| 5,394,529 A | 2/1995 | Brown, III et al. | 712/240 |
| 5,483,640 A | 1/1996 | Isfeld et al. | 709/213 |
| 5,530,845 A | 6/1996 | Hiatt et al. | 703/27 |
| 5,553,258 A | 9/1996 | Godiwala et al. | 711/3 |
| 5,991,825 A * | 11/1999 | Ng | 710/6 |
| 6,272,565 B1 * | 8/2001 | Lamberts | 710/43 |
| 6,310,743 B1 * | 10/2001 | Haines et al. | 360/78.07 |
| 6,339,811 B1 | 1/2002 | Gaertner et al. | 711/112 |
| 6,490,651 B1 * | 12/2002 | Shats et al. | 711/112 |
| 6,567,886 B1 * | 5/2003 | Saitoh et al. | 711/111 |
| 6,578,107 B1 * | 6/2003 | Anderson et al. | 711/113 |
| 2002/0004889 A1 * | 1/2002 | Honma et al. | 711/154 |

OTHER PUBLICATIONS

Interrupting Writes for Read Data, James A. Herbst, Steve Williams, Brad Brookes, Jan. 22, 2002.

* cited by examiner

Primary Examiner—Stephen Elmore
(74) Attorney, Agent, or Firm—Fish & Richardson P.C., P.A.

(57) ABSTRACT

Systems and methods in a disc drive improve data transfer performance by interrupting disc write operations to service read commands.

25 Claims, 7 Drawing Sheets

INTERRUPTING DISC WRITE OPERATIONS TO SERVICE READ COMMANDS

RELATED APPLICATIONS

This application claims priority of U.S. provisional application Ser. No. 60/353,699, filed Jan. 31, 2002.

FIELD OF THE INVENTION

This application relates generally to systems and methods for improving data storage device performance and more particularly to systems and methods for improving data storage device performance by interrupting disc write operations to service read commands.

BACKGROUND OF THE INVENTION

Modern hard disc drives comprise one or more rigid discs that are coated with a magnetizable medium and mounted on a hub of a spindle motor for rotation at a constant high speed about a rotational axis. Information is stored on one or more surfaces of the disc or discs in a plurality of concentric circular tracks. Data is written to, and/or read from, sectors on the tracks via transducers ("heads") mounted to a radial actuator that positions the heads relative to the discs. The read and write elements are typically positioned over specific sectors of the disc in accordance with read and write commands, respectively, received from a host connected to the disc drive. These commands, as well as their associated data, are transferred between the disc drive and the host via a communication interface, such as, for example, various versions of the Advanced Technology Attachment (ATA) interface or the Small Computer Systems Interface (SCSI) interface.

One of the primary performance characteristics of a disc drive is overall data transfer rate of the drive. The overall data transfer rate of the disc drive generally includes two main components, the external data transfer rate and the internal data transfer rate. The external data transfer rate, sometimes referred to as the interface, host, or burst transfer rate, relates to the speed at which data can be transferred between the disc drive and the host. The internal data transfer rate, sometimes referred to as the sustained transfer rate, relates to the speed at which a disc drive can read and write data to and from the tracks, once that data has been received or requested from the host. The internal data transfer rate typically includes the time required for the disc drive to process the read or write command, as well as the time required to move the transducer to the appropriate track to read or write the data.

While the internal and external data transfer rates of a disc drive are defined separately, they are often interrelated. For example, in accordance with many communication interface specifications, after sending a command to a disc drive, the host must wait for the disc drive to respond that the command has been serviced before the host may issue another command. That is, the host must wait for the data it requested until it can request more data. As such, the external transfer rate of the disc drive is limited, to some extent, by the time required by the disc drive to service commands. As will be appreciated, the time required by the disc drive to service the commands is primarily related to the internal data transfer rate.

A common way to increase both the internal and external data transfer rates involves providing some sort of disc caching mechanism in the disc drive to temporarily store data that is being written to or retrieved from the disc drive. Disc caching typically involves using a fast solid state memory in the disc drive as a buffer for data transferred between the disc drive and the host.

In accordance with one embodiment, a method for managing read commands and disc write operations in a disc drive is contemplated. In accordance with this embodiment, if the disc drive receives a read command from the host (or other some other computer process external to the disc drive) while the disc drive is conducting a disc write operation, then the disc write operation is discontinued to service the read command. By discontinuing the disc write operation to service the read command, the internal and/or external data transfer rates of the disc drive may be improved.

In disc drives employing write caching, when a host sends a write command to the disc drive, the data is immediately stored in the write cache for later writing to the disc. The disc drive then immediately informs the host that the data has been written to the disc. By informing the host immediately that the data has been written, rather than waiting until the data is actually written to the disc, the host is freed to prepare and send other read or write commands and/or to perform other data transfer functions, thus speeding up the external transfer rate of the disc drive.

In addition to speeding up the external transfer rate, the write cache may also be used to speed up the internal transfer rate of the disc drive. For example, in a process known as write coalescing, data received at the disc drive, in accordance with various write command from a host, is first stored in the write cache and then examined to locate blocks of data that are to be written to the disc in contiguous data blocks. That is, contiguous data blocks are blocks of data that have contiguous logical block addresses or blocks of data that can be written to the disc in a single disc write operation. Once located, these contiguous data blocks are then combined or coalesced and written to the disc in a single disc write operation. By writing this data in a single disc write operation, rather than a number of individual write operations, the internal data transfer rate of the disc drive may be improved.

Additionally, a write cache may also be used as a temporary buffer for future read operations. For example, when a command is received from the host to read a particular block of data, the write cache may first be searched to determine if the requested data is still present in the write cache. If the data is still present, the data can be then be sent back to the disc drive directly from the write cache, without requiring the disc drive to spend additional time accessing the disc for the data.

In disc drives employing read caching, data that is read from the discs of the disc drive in response to a read command from the host, is stored in the read cache before it is sent off to the host. Additionally, read caching may also involve storing "extra" data, sometimes referred to as look-ahead data, that was not requested by the host in the read command, but which is located on the same track as the requested data on the disc drive. This is done because hosts tend to request data from the disc drive in a sequential or predictably ordered manner. As such, when the host sends the next read command, it is likely that at least part of the data requested will have been read into the cache in the look-ahead operation. Again, since data retrieval from the read cache is typically several thousand times faster than data retrieval from the disc, data transfer rates can be greatly increased by using the read caching.

As described, in a typical disc drive employing data caching, when a read command arrives at the disc drive, the disc drive first checks to see whether the requested data is in the read and/or write cache. If the read and/or write cache contains the data, the requested data is sent immediately to the host from the cache. If, however, the cache does not contain the requested data, the drive must retrieve the requested data from the discs. If the disc drive is currently busy, such as performing a write operation, the disc drive, and thus the host, must wait until the write operation is complete before retrieving the requested data from the disc. In this situation, disc caching does nothing to speed up the retrieval of the requested information from the disc (internal data transfer rate) or the transmission of the data back to the host (external transfer rate). As such, both the internal and external data transfer rates of the disc drive will suffer. This situation is made worse when a number of write commands have been combined or coalesced into one long disc write operation, thus increasing the time for the disc write operation to complete.

As such, there is a need in the art for systems and/or methods that allow for the fast servicing of read-commands, even in situations where a lengthy disc write operation is being carried out in the disc drive. It is against this backdrop that the present invention has been developed.

SUMMARY OF THE INVENTION

In general, the various embodiments of the present invention described herein relate to systems and methods for processing read and write commands in a disc drive. More particularly, the various embodiments described herein relate to systems and methods for discontinuing a disc write operation in a disc drive to service a read command from a host, so as to improves the internal and external data transfer rates of the disc drive.

In accordance with one embodiment, a method for managing read commands and disc write operations in a disc drive is contemplated. In accordance with this embodiment, if the disc drive receives a read command from the host (or other some other computer process external to the disc drive) while the disc drive is conducting a disc write operation, then the disc write operation is discontinued to service the read command. By discontinuing the disc write operation to service the read command, the internal and/or external data transfer rates of the disc drive may be improved.

In accordance with another embodiment, data is written from a write cache to a disc in the disc drive in accordance with a disc write operation. If, during the disc write operation, a read command is received by the disc drive, a determination is made as to whether it is appropriate or desired to interrupt the disc write operation to service the read command. If it is determined that it is appropriate or desired to interrupt the disc write operation, the disc write operation is interrupted, and the read command is serviced. Additionally, the remaining unwritten part of the data that was to be written to the disc during the disc write operation may be reestablished in the write cache after the disc write operation has been interrupted.

These and various other features as well as advantages which characterize the present invention will be apparent from a reading of the following detailed description and a review of the associated drawings.

DETAILED DESCRIPTION

In general, the various embodiments of the present invention described herein relate to systems and methods for processing read and write commands in a disc drive. More particularly, the various embodiments described herein relate to systems and methods for discontinuing a disc write operation in a disc drive to service a read command from a host, so as to improve the internal and external data transfer rates of the disc drive.

Figure 1:
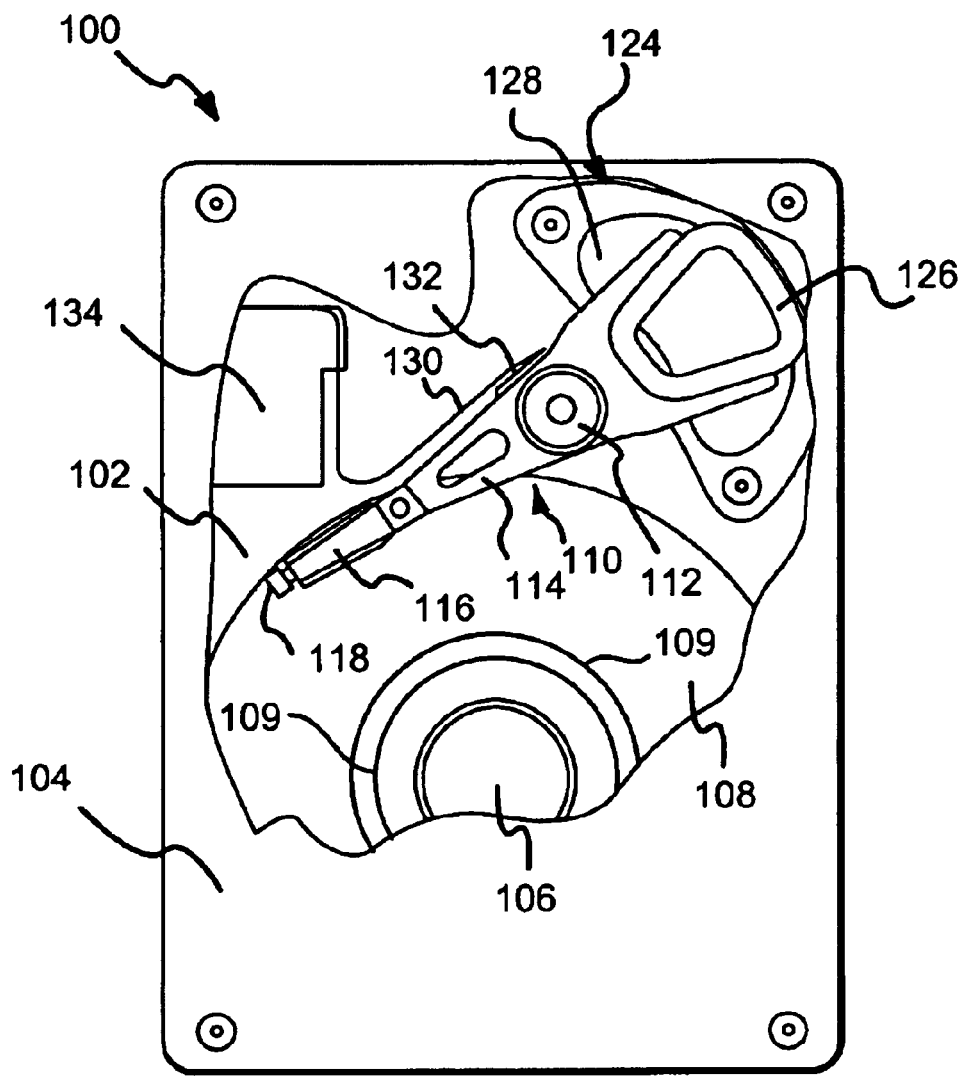
FIG. 1 is a plan view of a disc drive incorporating an embodiment of the present invention.

An exemplary disc drive 100 in which embodiments of the present invention may be incorporated is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 that rotates one or more magnetic discs 108 at a constant high speed. Information is written to and read from nominally circular, concentric tracks 109 on the discs 108 through the use of an actuator assembly 110, which rotates during a seek operation about a bearing shaft assembly 112 positioned adjacent the discs 108. The actuator assembly 110 includes a plurality of actuator arms 114 that extend towards the discs 108. One or more flexures 116 extending from each of the actuator arms 114. Mounted at the distal end of each of the flexures 116 is a head 118 that includes an air bearing slider enabling the head 118 to fly in close proximity above the corresponding surface of the associated disc 108.

As shown in FIG. 1, the disc drive 100 includes a voice coil motor (VCM) 124, which typically includes a coil 126 attached to the actuator assembly 110, as well as one or more permanent magnets 128 that establish a magnetic field in which the coil 126 is immersed. The controlled application of current to the coil 126 causes magnetic interaction between the permanent magnets 128 and the coil 126, so that the coil 126 moves in accordance with the well known Lorentz relationship. As the coil 126 moves, the actuator assembly 110 pivots about the bearing shaft assembly 112, and the heads 118 are caused to move across the surfaces of the discs 108.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
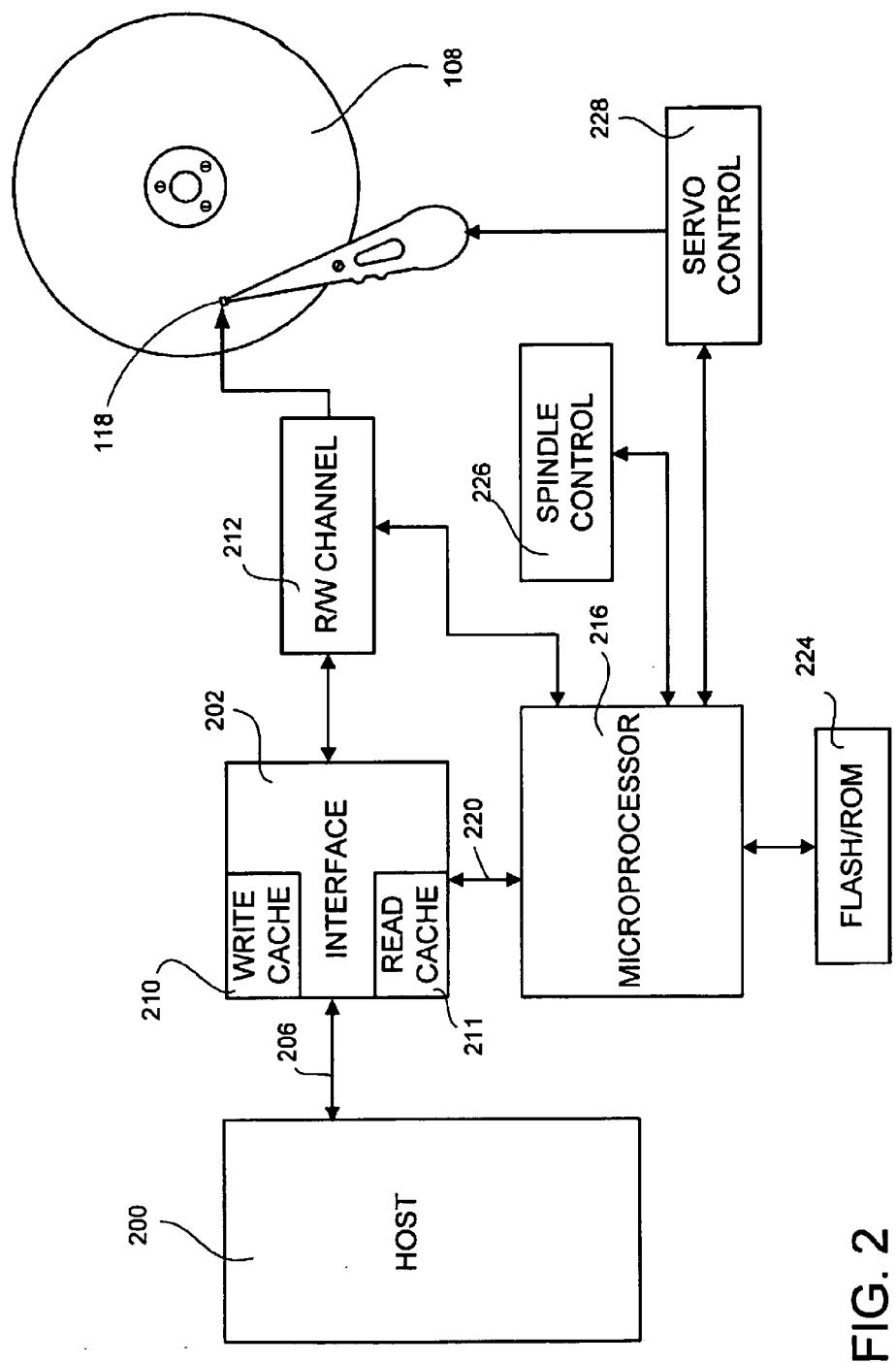
FIG. 2 is a functional block diagram generally showing the main functional components used to control the disc drive of FIG. 1.

Referring now to FIG. 2, shown therein is a generalized functional block diagram of the disc drive 100 of FIG. 1, illustrating some of the functional components of the disc drive 100. Some of these components may be resident on a disc drive PCB (not shown) and may be used to control the operation of the disc drive 100. As shown in FIG. 2, the disc drive includes an interface application specific integrated circuit (interface) 202. In operation, the interface 202 receives commands, such as read and write commands, from a host 200. The host may be any computer, computer network, or computer process that is operable to send commands to the disc drive. The interface 202 includes an associated buffer or cache, such as a write cache 210 and/or a read cache 211, to facilitate high speed data transfer from a host 200.

Data to be written to the disc 108 of the disc drive 100 are passed via one or more data paths 206 to the interface 202 and then into the write cache 210. When deemed appropriate by the disc drive, the data are passed, either alone or in combination with other data stored in the write cache 210, to a read/write channel 212, which encodes and/or serializes the data and provides the requisite write current signals to the write elements of the head 118, to cause the data to be written to appropriate data sectors on the disc(s) 108 of the disc drive 100. After data has been written to the disc 108, it may then be read back by passing the read element of the head 118 over the data to produce a corresponding read current, which is then decoded and/or deserialized by the read/write channel 212 and sent to the interface 202 for transmission to the host 200. Additionally, before being sent, the data may be held in the read cache 211.

As also shown in FIG. 2, a microprocessor 216 is operably connected by electrical path 220 to the interface 202. The microprocessor 216 provides top level communication and control for the disc drive 100 in conjunction with programming for the microprocessor 216 that may be stored in a non-volatile microprocessor memory (MEM) 224. The MEM 224 can include random access memory (RAM), read only memory (ROM) and other sources of resident memory for the microprocessor 216. Additionally, the microprocessor 216 provides control signals for spindle control 226, and servo control 228.

Each track 109 of the disc drive 100 shown in FIG. 1 preferably includes a number of servo sectors that are periodically interspersed with data sector along the track 109. As is typical, the data sectors are used to store user data and the servo sectors are used to store prerecorded servo information that is employed by a disc drive servo system to control the position of the read/write heads over the disc(s) 108.

Data to be written to or stored in the data sectors on the discs of the disc drive are typically received in conjunction with a write command from the host 200. As used herein, the term "write command" refers to a command that is received by the disc drive 100 requesting that data associated with the write command be written to data sectors on a disc 108 of the disc drive 100. The data associated with the write command is preferably stored in the write cache 210 of the disc drive for later writing to disc(s) of the disc drive. At some later point, this data is then written to data sectors on the disc(s) of the disc drive in accordance with a disc write operation. As used herein the term "disc write operation" refers to the operation of actually writing blocks of data that have been stored in the write cache 210 to data sectors on a disc 108 of the disc drive 100. The data that is written to the data sectors in accordance with a disc write operation may be data that was transmitted to the disc drive along with a single write command from the host. Alternatively, the data that is written to the data sectors in accordance with a disc write operation may be data that was transmitted to the disc drive in accordance with other write commands from the host.

To retrieve data from the disc drive 100, the host may issue a read command to the disc drive requesting specified data. As used herein, the term "read command" refers to a command received by the disc drive 100 requesting that specified data stored in the disc drive 100 is read and transmitted to the disc drive. The data that is requested in the read command is then located in the disc drive and transmitted to the host 200. In some cases, the data will be located in a cache on the disc drive, such as read cache 211 and/or write cache 210. In such cases, the data is transmitted directly from the cache to the host, without requiring the data to be read from data sectors. In other cases, the data must first be read from the data sectors on the disc(s) of the disc drive, and then sent to the host 200. Additionally, after the data is read from the data sectors, in some cases it may be temporarily stored in a read cache on the disc drive before being sent to the host 200.

FIGS. 3, 4, 5, 6 and 7 illustrate operational flows exemplifying various methods related to servicing commands in the disc drive 100 from a computer or computing process located remotely from the disc drive 100. The operations shown in FIGS. 3, 4, 5, 6 and 7 may be implemented (1) as a sequence of microprocessor implemented acts or program modules running on one or more microprocessors and/or (2) as interconnected machine logic circuits or circuit modules within the disc drive. For example, as will be described, various of the operations shown in FIGS. 3, 4, 5, 6 and 7 may be performed by the microprocessor 216 and/or the interface 202. Alternatively, the operations shown in FIGS. 3, 4, 5, 6 and 7 may be implemented performed by other hardware, software or firmware in the disc drive 100. The implementation of the operations shown in FIGS. 3, 4, 5, 6 and 7 is a matter of choice dependent on performance requirements and/or hardware and software capabilities of the disc drive 100. While some of the operations shown are preferably implemented as software stored on a computer readable medium, it will be recognized by one skilled in the art that these operations may be implemented in software, in firmware, in special purpose digital logic, or any combination thereof without deviating from the spirit and scope of the present invention, as recited in the claims attached hereto. As used herein, computer readable medium may be any available medium that can store or embody computer-readable instructions.

Figure 3:
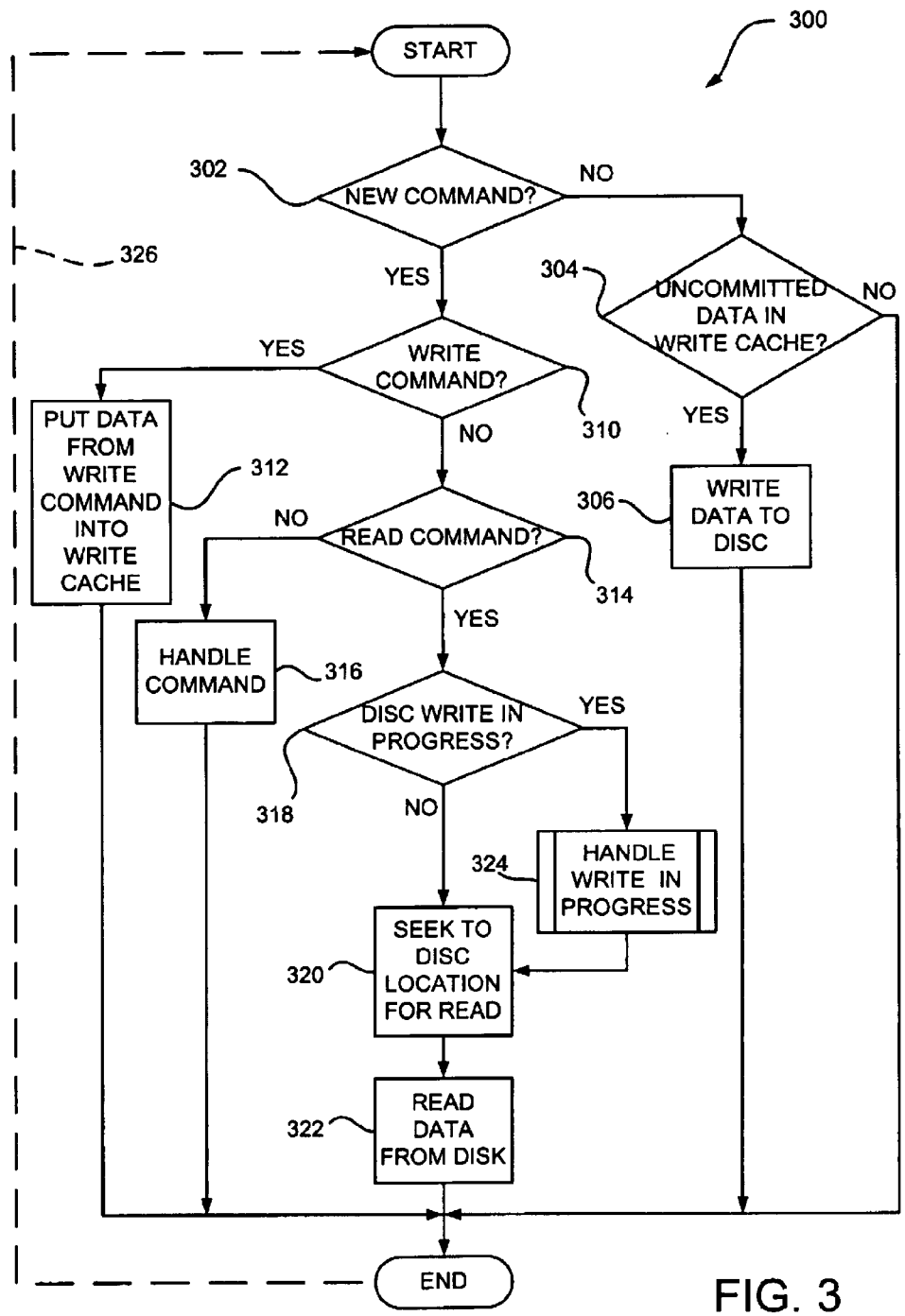
FIG. 3 illustrates an operation flow including various operations for handling commands received by the disc drive shown in FIG. 1, in accordance with an embodiment of the present invention.

Turning now to FIG. 3, shown therein is an operation flow 300 including various operations for handling commands from a computer or computing process located remotely from the disc drive 100, such as the host 200. At the start of the operational flow 300, a new command operation 302 determines if a new command has been received from the host 200 by the disc drive 100. The commands received from the host 200 may be write commands, read commands, or other commands, such as a status command, etc. If it is determined by the new command operation 302 that a new command has not been received from the host 200, a cache determination operation 304 determines if the write cache 210 contains any uncommitted data waiting to be written to the disc(s) 108. That is, the cache determination operation 304 determines if the write cache 210 contains any unwritten data not associated with a disc write operation that is currently writing data to the disc, but which is to be written to the disc 108.

If the cache determination operation 304 determines that the write cache 210 does not contain uncommitted data, the operational flow 300 ends. However, if the cache determination operation 304 determines that the write cache 210 does contains uncommitted data waiting to be written to the disc(s) 108, a disc write operation 306 writes all, or a part of, the uncommitted data to the disc. For example, if uncommitted data in the cache are associated with a number of disc write operations, the data associated with one of the disc write operations will be written to the disc in a disc write operation, and the operational flow 300 will end.

If it is determined in the new command operation 302 that a new command has been received from the host 200, a write command determination operation 310 then determines if the command received from the host 200 is a write command. If the write command determination operation 310 determines that the command received from the host 200 is a write command, the data associated with the write command is placed in the write cache 210 by caching operation 312, and the operational flow 300 ends. If, however, the write command determination operation 310 determines that the command received from the host 200 is not a write command, a read command determination operation 314 determines if the command received from the host 200 is a read command.

If the read command determination operation 314 determines that the command received from the host is not a read command, a command handling operation 316 handles the command, and the operational flow 300 ends. As will be appreciated, commands handled by the command handling operation 316 are not read commands or a write commands, but rather are other type of commands received by the disc drive from the host 200, such as a status command, etc. As such, the command handling operation 316 handles the command in accordance with the appropriate operational procedures of the disc drive 100 for handling the specific type of command received.

If the read command determination operation 314 determines that the command received from the host 200 is a read command, a disc write determination operation 318 determines if a disc write operation is in progress. That is, the disc write determination operation 318 determines if a disc write operation is currently writing data to a disc of the disc drive 100. As described above, the data written to the disc in accordance with the disc write operation may be stored in the write cache. If the disc write determination operation 318 determines that a disc write operation is not in progress, a seek operation 320 performs a seek to the first data sector of the data requested in the read command. A disc read operation 322 then reads the data requested by the read operation 322 from the appropriate data sector(s). The read data is then processed by the disc drive 100 and sent to the host 200, and the operational flow 300 ends.

If the disc write determination operation 318 determines that a disc write operation is in progress, a handle write in progress operation 324 is performed. Various embodiments of the handle write in progress operation 324, and the operations that may take place therein, are described in more detail below with respect to FIGS. 4, 5, 6, and 7. However, in general, the handle write in progress operation 324 determines if it is appropriate or desired to interrupt or abort the disc write operation in progress to service the read command. Following the handle write in progress operation 324, the operational flow 300 continues to seek operation 320, and then to the read operation 322, as previously described.

As will be noted, FIG. 3 includes a dashed line 326 extending from the end of the operational flow 300 to the start of the operation flow 300. This dashed lines is intended to indicate that the entire operational flow 300 comprises an operational loop that may be performed repeatedly in the disc drive 100. As will be appreciated by those skilled in the art, this operational loop will preferably be performed repeatedly while the disc drive 100 is in its normal operational state, such as when commands are being received from the host 200.

Turning now more particularly to the handle write in progress operation 324, as will be described, various embodiments of the present invention relate particularly to the operations that take place therein. For example, and without limitation, FIGS. 4, 5, 6 and 7 each illustrate operations that take place in accordance with embodiments of the handle write in progress operation 324. In general, the handle write in progress operation 324 determines if it is appropriate or desired to discontinue a disc write operation that is in progress to service a read command from the host 200. In this context, discontinuing the disc write operation comprises either aborting or interrupting the disc write operation.

A disc write operation is defined as being "in progress," if the disc write operation is currently writing data to data sectors on a disc(s) of the disc drive. Aborting the disc write operation is defined as ending the disc write operation before all data associated with the disc write operation has been written to data sectors of the disc drive and reestablishing all of the data associated with disc write operation in the write cache 210. In contrast to aborting the disc write operation, interrupting the disc write operation is defined as ending the disc write operation before all data associated with the disc write operation has been written to data sectors of the disc drive and reestablishing only a portion of the data associated with the disc write operation in the write cache 210. Preferably, the portion of data associated with the disc write operation that is reestablished in the write cache when the disc write operation is interrupted will be that portion of the data that was not written to data sectors in the disc(s) as a result of the interruption of the disc write operation, that is, the left over data.

As will be appreciated by those skilled in the art, reestablishing data in a cache, such as the write cache 210, typically involves reestablishing in a cache access table, or the like, that the data being reestablished is to remain in the cache. However, in general, and as used herein, reestablishing data in the cache refers to causing the data to be recognized by the disc drive as being contained in the cache, regardless of the mechanism used to achieve this recognition.

As previously noted, FIGS. 4, 5, 6 and 7 illustrate operational flows 400, 500, 600, and 700, respectively, of various embodiments of the handle write in progress operation 324 of the operational flow 300, shown in FIG. 3. It should be noted that while the handle write in progress operation 324 has been, and will be, described with respect to the command handling operations illustrated in operational flow 300, the various embodiments of the handle write in progress operation 324 illustrated in FIGS. 4, 5, 6 and 7 may alternatively be performed in association with other command handling operations. That is, the various embodiments of the handle write in progress operation 324 illustrated in FIGS. 4, 5, 6 and 7 may be performed in association with any other command handling operations that initiate or call the handle write in progress operation 324 when it has been determined by the disc drive 100 that a read operation has been received from the host 200 and that a disc write operation is in progress in the disc drive 100.

Figure 4:
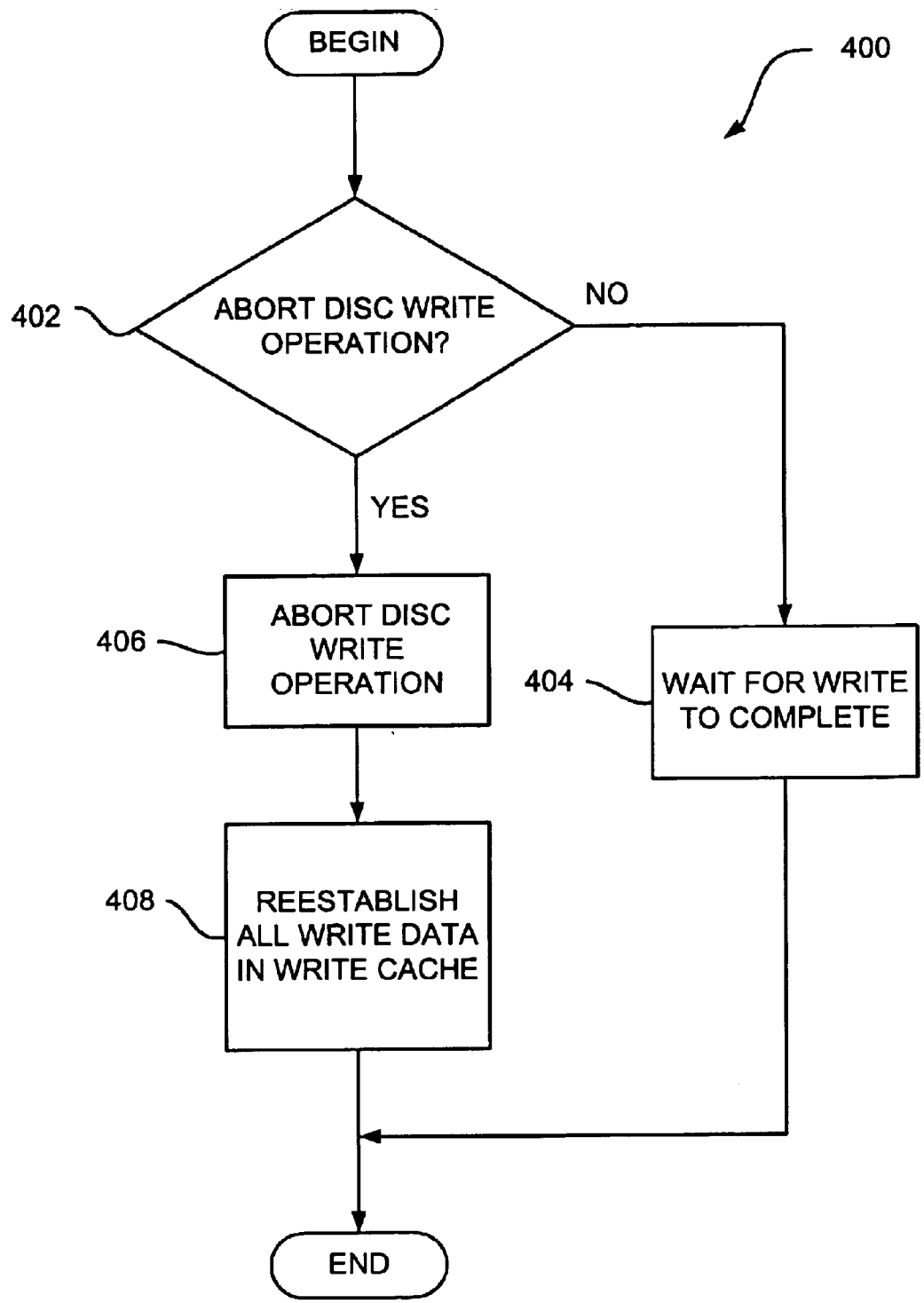
FIG. 4 illustrates an operational flow of a handle write in progress operation of FIG. 3, in accordance with an embodiment of the present invention.

Turning now to FIG. 4, illustrated therein is an operational flow 400 of one embodiment of the handle write in progress operation 324. As previously described, the handle write in progress operation 324, and thus the operational flow 400, occurs after it has been determined that a read command has been received from the host, and that a disc write command is in progress.

As shown, at the beginning of the operational flow 400, a determination operation 402 determines if the disc write operation should be, or is to be, aborted. This determination may be made in a number of ways by the determination operation 402, as is described in detail below. If the determination operation 402 determines that the disc write operation in progress is not to be aborted, a wait operation 404 causes the operational flow 400 to be halted while the disc write operation is completed, and then the operational flow 400 ends. If, however, the determination operation 402 determines that the disc write operation in progress is to be aborted, the operational flow 400 continues to the abort operation 406, which causes the write operation to be aborted. Next, a reestablish operation 408 reestablishes all of the data that was to be written in the aborted disc write operation back in the write cache 210, and the operational flow 400 ends.

As mentioned, the determination operation 402 may determine whether the disc write operation should be aborted in a number of ways. For example, in a first embodiment the determination operation 402 is "hard wired" or programmed to always determine that the disc write operation in progress should be aborted. In this first embodiment, the operational flow 400 always proceeds to an abort operation 406 following the determination operation 402. However, in other embodiments, the determination operation 402 determines whether the disc write operation in progress should be aborted, based on some predetermined criteria, as will now be described.

In a second embodiment of the determination operation 402, the determination as to whether the disc write operation in progress should be aborted is made by checking a disc write operation abort indicator, such as a logical bit. In accordance with this second embodiment of the determination operation 402, the disc write operation abort indicator may be set by the host 200, by the user of the disc drive, or by the disc drive itself. For example, and without limitation, the disc write operation abort indicator may be set by the host 200 based on decisions or selections made by the host related to the need or desire to abort a disc write operation in progress in the disc drive. Alternatively, the disc write operation abort indicator may be set manually by the disc drive user, such as by setting a jumper or a switch on the disc drive, or by issuing the disc drive a command via a computer process executing outside of the disc drive. The disc write operation abort indicator may also be set by processes or operations in the disc drive itself. Regardless of how the disc write operation abort indicator is set, if the disc write operation abort indicator indicates that the disc write operation should be aborted, the operational flow 400 proceeds to the abort operation 406 following the determination operation 402.

In accordance with a third embodiment of the determination operation 402, the determination as to whether the disc write operation should be aborted is based on whether time will be saved in servicing the read command from the host 200 if the disc write operation is aborted. With respect to determining time periods in the disc drive, as is known in the art, many disc drives include mechanisms or algorithms that are operable to determine the time required to move the transducer 118 from one location to another location, or to access a given location on the disc from another location on the disc. This time may include rotational as well as seek time. Additionally, this time may be measured and/or specified as a unit of time, such as milliseconds or clock pluses, or it may be measured and/or specified in units related to the rotation of the disc(s) in the disc drive, such as the number of servo bursts, data sectors, or servo and data sectors encountered by the transducer 118 as the disc rotates and/or as the transducer is radially moved from one location on the disc to access another location on the disc.

The determination of whether time will be saved in servicing the read command from the host 200 in this third embodiment of the determination operation 402 may be made, for example, by comparing the overall time required to complete the disc write operation and to access a specified sector associated with the data requested in the read command, with another specified time period. The specified sector associated with the data requested may be a data sector associated with the read command or a servo sector associated with the read command. For example, and without limitation, the specified sector may be the first data sector that is to be read in a sequence of data sectors specified by the read command. Alternatively, and with out limitation, the specified sector may be a servo sector that will be read while or before accessing the data specified in the read command, such as the first servo sector preceding the first data sector that is to be read in a sequence of data sectors specified by the read command. As will be appreciated by those skilled in the art, the overall time required to complete the disc write operation and to access the specified sector may include rotational as well as seek time.

In this third embodiment, the specified time period may be a static predetermined time period, such as, the time required to complete some fraction of a rotation of the disc, or some other predetermined static time period. Alternatively, the predetermined time period may be a dynamically determined time period that is determined in the disc drive itself, or by a process outside of the disc drive, such as a process in the host 200. For example, and without limitation, the predetermined time period may be the time required to position the transducer so as to read the first sector of the data requested in the read command, without completing the disc write operation.

Figure 5:
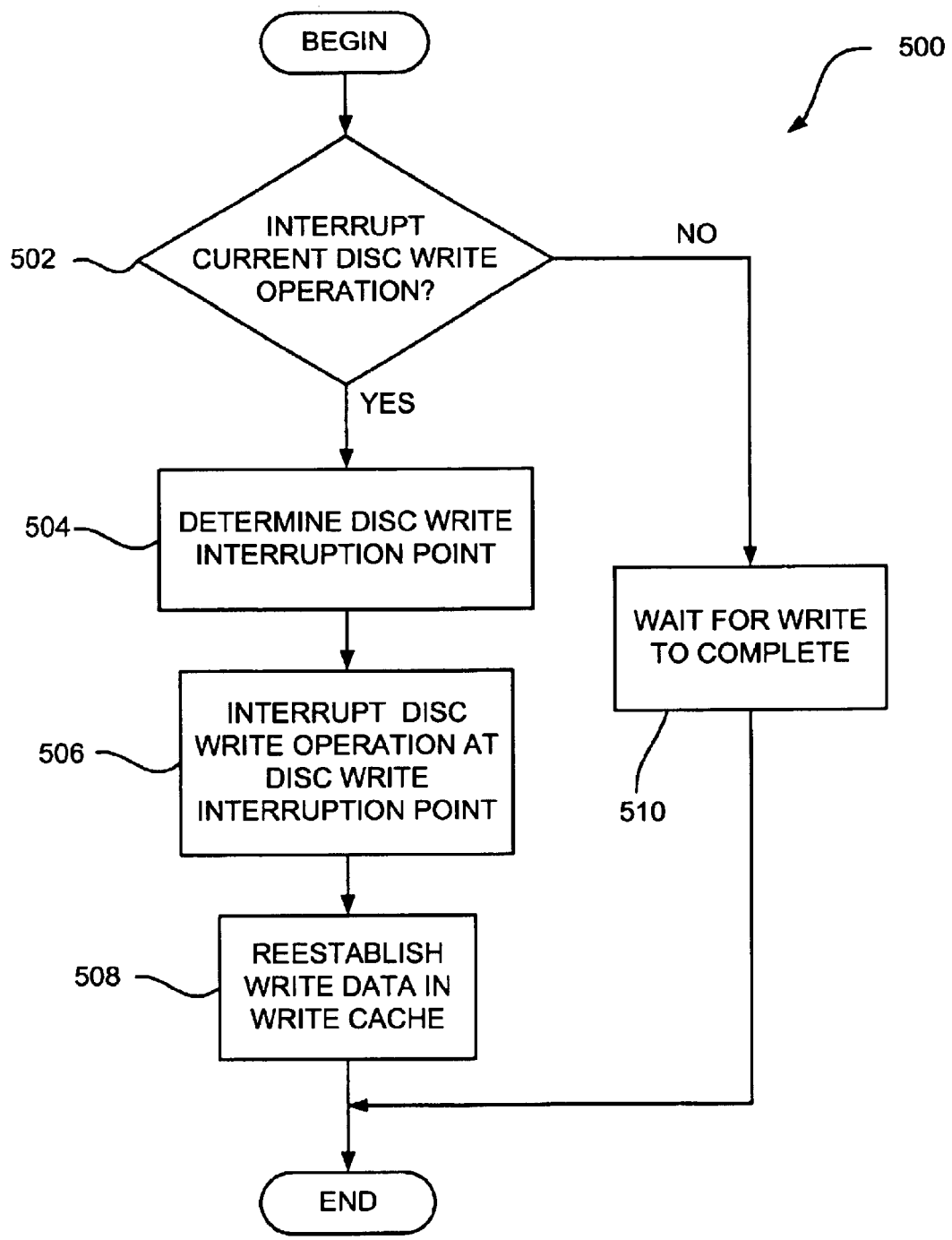
FIG. 5 illustrates an operational flow of the handle write in progress operation of FIG. 3, in accordance with another embodiment of the present invention.

Turning now to FIG. 5, illustrated therein is an operational flow 500 of another embodiment of the handle write in progress operation 324. As previously described, the handle write in progress operation 324, and thus the operational flow 500, occurs after it has been determined that a read command has been received from the host, and that a disc write operation is in progress. As shown in FIG. 5, at the beginning of the operational flow 500, an interrupt determination operation 502 determines if the disc write operation is to be interrupted. This determination may be made in a number of ways in accordance with this embodiment of the interrupt determination operation 502. However, in general, the interrupt determination operation 502 in this embodiment will determine if some predetermined criteria is met. For example, in one embodiment, the interrupt determination operation 502 determines if time will be saved in servicing the read command if the disc write operation is interrupted. This determination may be made in any number of ways in the disc drive.

As previously described, many disc drives include mechanisms and/or algorithms that are operable to determine the time required to move the transducer 118 from one location to another location, or to access one location on the disc from another location on the disc. Using these mechanisms and/or algorithms, in one embodiment, the interrupt determination operation 502 determines or calculates the time (T1) required to access a particular sector associated with the read command from a specified location, such as the data sector currently being written to by the disc write operation, or a servo sector in close proximity to the data sector currently being written to. T1 may including the rotational as well as seek time required to access the first sector of the data requested.

The interrupt determination operation 502 also determines or calculates the time (T2) required to complete the disc write operation in progress. The interrupt determination operation 502 also determines or calculates the time (T3) required to seek from the current track, where the write operation is writing data, to the track containing the first sector of data requested in the read operation. The sum of T2 and T3 (T2+T3) is then calculated as T4 (T4=T3+T2). If T4 is less than T1, the disc write operation is not interrupted. Rather, a wait operation 510 causes the operational flow 500 to be halted while the disc write operation is completed. Following the wait operation 510, the operational flow 500 ends. However, if T4 is less than T1, the operational flow 500 proceeds to a determination operation 504. In calculating T4, a constant (C) may be added to the sum T4 to compensate or account for various process delays (T1+T2+C=T4). The constant (C) may be predetermined, such as, for example, the time necessary to complete a fraction of a rotation of a disc in the disc drive. Alternatively, the constant (C) may be dynamically determined.

If it is determined in the interrupt determination operation 502 that the disc write operation is to be interrupted, an interruption point determination operation 504 then determines the precise point or location where the disc write operation is to be interrupted. In general, the interruption point determination operation 504 determines a point in the disc write operation from which a seek can be made to the data requested in the read command, without requiring an additional revolution of the disc to be made. Stated another way, the interruption point determination operation 504 will select a point to interrupt the disc write operation, such that a revolution will not be slipped in accessing the data requested in the read command.

In one embodiment, the point selected in the interruption point determination operation 504 is determined from the previously calculated values of T1, T2, and/or T3. For example, in one embodiment, a time T5 will be calculated as follows, T5=T1−(T3+K), where K is a predetermined constant. That is, T5 equals the time (T1) required to position the transducer to access the data requested in the read command, including the rotational as well as seek time, minus the sum of the time (T3) required to seek from the current track to the track containing the data requested in the read operation, and the constant K. A determination is then made as to the sector over which the transducer will be positioned at time T5. The determined sector is then designated as the interruption point of the disc write operation. As will be appreciated, the determined sector may be a specific data sector or servo sector, depending on disc drive positioning functionality.

Following the interruption point determination operation 504, an interrupt operation 506 interrupts the disc write operation in progress at the interruption point determined in interrupt determination operation 502. Next, a reestablish operation 508 reestablishes a portion of the data associated with the disc write operation in the cache, and the operational flow 500 ends. In one embodiment, the portion of the data that is reestablished in the cache is the data that was specified to be written in accordance with the disc write operation, but which was not written due to the interruption of the disc write operation.

Figure 6:
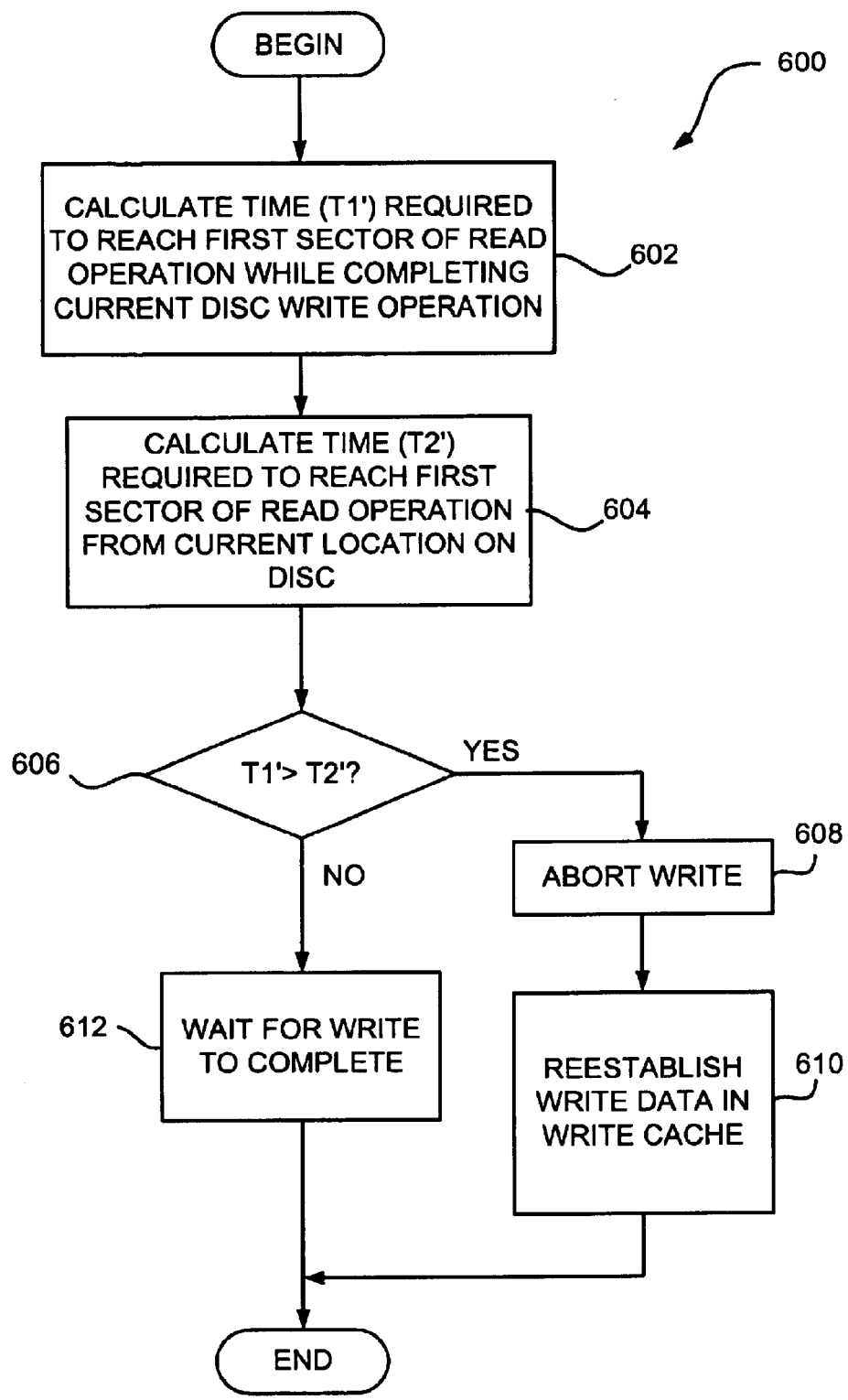
FIG. 6 illustrates an operational flow of the handle write in progress operation of FIG. 3, in accordance with yet another embodiment of the present invention.

Turning now to FIG. 6, illustrated therein is an operational flow 600 of another embodiment of the handle write in progress operation 324. As previously described, the handle write in progress operation 324, and thus the operational flow 600, occurs after it has been determined that a read command has been received from the host, and that a disc write command is in progress. As shown in FIG. 6, at the beginning of the operational flow 600, a calculate T1' operation 602 calculates the time (T1') required to access a first data sector associated with the data requested in the read operation while still completing the disc write operation. Alternatively, the calculate T1' operation 602 may calculate the time (T1) required to access a servo sector immediately preceding the first data sector associated with the data requested in the read operation while still completing the disc write operation. As will be appreciated by those skilled in the art, there are a number of ways in which the time T1' may be calculated during the calculate T1' operation 602.

By way of example, and not limitation, the time T1' may be generally calculated as the sum of the time required to write the remaining sectors of the disc write operation, the time required to seek from the current track to the track containing the data that is to be read, and the rotational time needed to access the first data sector (or a servo sector preceding the first data sector) once the seek has been completed. In other embodiments, T1' may be calculated in other ways known in the art. T1' may be specified as a unit of time. However T1' may also be specified in units more commonly used in disc drives, such as units related to the rotation of the disc(s) in the disc drive, as previously described.

Following the calculate T1' operation 602, a calculate T2' operation 604 calculates the time required to reach the location of the first data sector that is being requested in the read operation from the sector currently being written by the disc write operation, or from a predetermined data sector occurring after the sector currently being written. Alternatively, the calculate T2' operation 602 may calculate the time (T2') required to access a servo sector immediately preceding the first data sector associated with the data requested in the read operation, or from a predetermined servo sector occurring after the sector currently being written. By way of example, and not limitation, the time T2' may be generally calculated by determining the seek and rotational time necessary to access the first sector of the data that is to be read in accordance with the read operation from the host from the current location of the transducer. As with T1', T2' may also be specified as a unit of time or as a unit associated with the rotation of the discs in the disc drive, as described above. However, the units of measure used for T1' and T2' should be identical. Furthermore, in the case where T1' is calculated relative to a servo sector rather than a data sector, T2' should likewise be calculated relative to a servo sector.

Next, a determination operation 606 determines if T1' is greater than T2'. If the determination operation 606 determines that T1' is greater than T2', an abort write operation 608 aborts the disc write operation. A reestablish operation 610 then reestablishes all of the data associated with aborted disc write operation back into the write buffer 210 for later writing to the disc. Following the reestablish operation 610, the operational flow 600 then ends. If, however, the determination operation 606 determines that T1' is not greater than T1', a wait operation 610 causes the operational flow 600 to be halted while the disc write operation is completed. Following the wait operation, the operational flow 600 ends.

Figure 7:
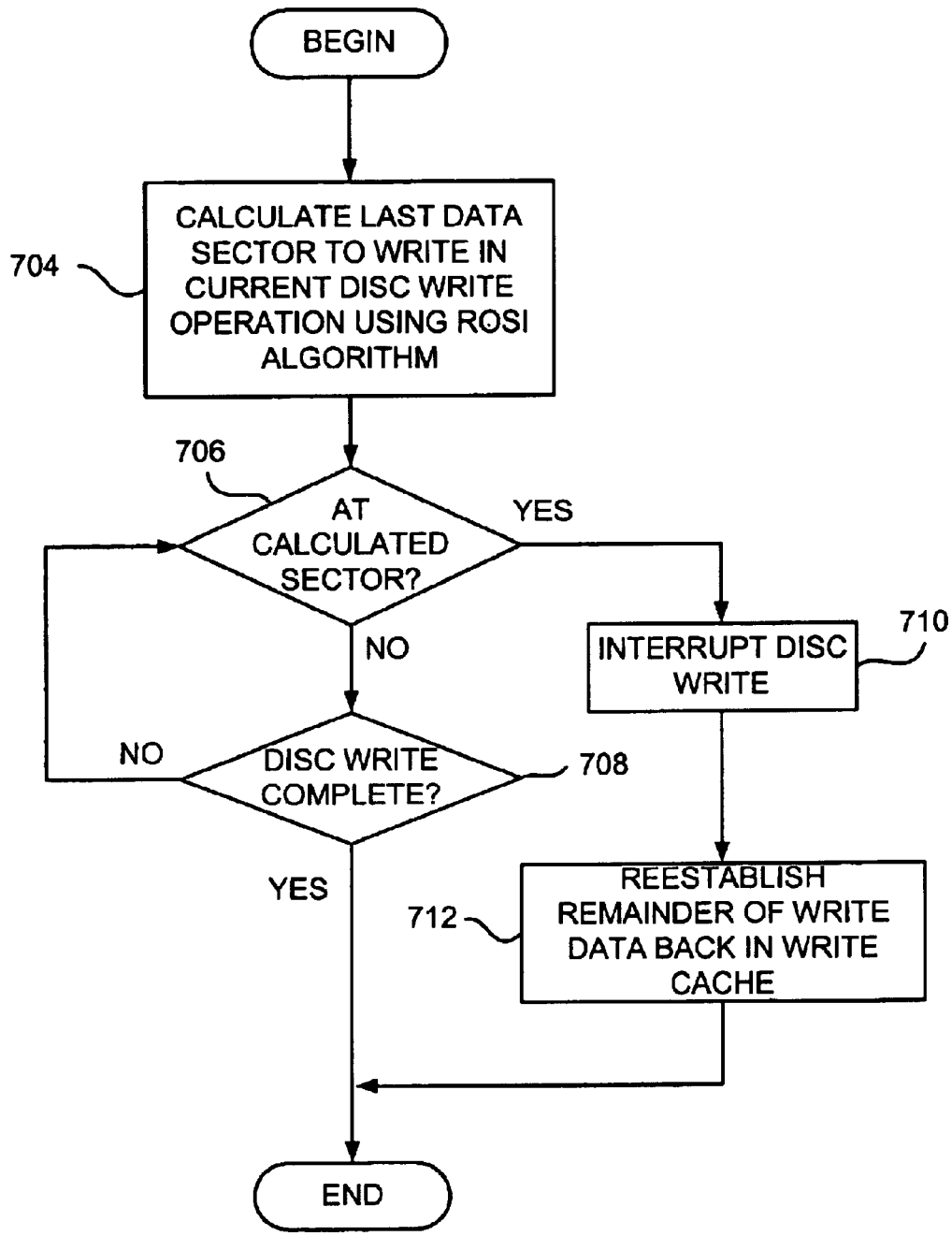
FIG. 7 illustrates an operational flow of the handle write in progress operation of FIG. 3, in accordance with another embodiment of the present invention.

Turning now to FIG. 7, illustrated therein is an operational flow 700 of another embodiment of the handle write in progress operation 324. As previously describe, the handle write in progress operation 324, and thus the operational flow 700, occurs after it has been determined that a read command has been received from the host, and that a disc write command is in progress. As shown in FIG. 7, at the start of operational flow 700, a calculate operation 704 calculates the last data sector to which data is to be written in the disc write operation, or the last servo sector that is to be accessed before the disc write operation is ended, using a rotationally optimized seek initiation (ROSI) algorithm. In general, a ROSI algorithms calculates the optimum point in the disc write operation at which a seek should be made to the track containing the first sector of data associated with the read operation from the host. In particular, the ROSI algorithm determines an access amount representative of the time required for the transducer to access the first data sector containing data associated with the read command from the host, from the transducers current position. The access amount may be specified in time, or in the number of servo bursts or sectors.

Next, the ROSI algorithm calculates the seek amount required to move the transducer from the track over which the transducer is currently located to the track on which the first data sector containing data associated with the read command from the host is located. The seek amount may be specified in time, or in the number of servo bursts or sectors. A latency amount is then calculated from the access amount and the seek amount. The latency may be specified in time, or in the number of servo bursts or sectors. For example, the latency amount may be computed by subtracting the seek amount from the access amount. The last data sector to which data is to be written in the disc write operation before seeking to the first sector specified in the read command is then determined using the latency amount. For example, last data sector to which data is to be written in the disc write operation may be determined as the sector over which the transducer will be positioned after the time specified in the latency amount has passed, or the number of servo bursts or sectors specified by the latency amount have passed under the transducer.

It should be understood that in some instances, the ROSI algorithm may determine that the last data sector to which data is to be written (or the last servo sector to be read) in accordance with the disc write operation is, in fact, the present data sector. In such a case, the ROSI algorithm also acts as a determination operation that determines whether the disc write operation should be interrupted to service the read command. Further details regarding calculating the last data sector to which data is to be written in the disc write operation, using a rotationally optimized seek initiation (ROSI) algorithm, may be had by reference to U.S. Pat. No. 6,339,811 issued Jan. 15, 2002 to Gaertner et al., which is hereby incorporated by reference.

Following the calculate operation 704, a determination operation 706 determines if the transducer is currently at or over the last data sector to which data is to be written (or last servo sector that is to be accessed) in the disc write operation, as calculated in the calculate operation 704. If the transducer is currently at or over the last data sector (or last servo sector), a write complete determination operation 708 determines if the disc write operation has completed. If the write complete determination operation 708 determines that the disc write operation has completed, the operational flow ends. If the write complete determination operation 708 determines that the disc write operation has not completed, the operational flow returns to the determination operation 706.

If the determination operation 706 determines that the transducer is currently at or over the last data sector (or last servo sector), an interrupt write operation interrupts the disc write operation. Next, a reestablish operation 710 reestablishes the data associated with the disc write operation that was not yet written to the disc back into the write cache, and the operational flow 700 ends. That is, the data that was intended to be written in the disc write operation, but which was not written due to the interruption of the disc write operation, is reestablished in the write cache. Again, in most cases, reestablishing the data back in the write cache will involve reestablishing in a cache access table, or the like, that the data is to remain in the cache.

In summary, in view of the foregoing discussion it will be understood that various embodiments of the present invention relate to systems and methods for discontinuing a disc write operation in a disc drive 100 to service a read command from the host 200, so as to improve the internal and external data transfer rates of the disc drive. In accordance with one embodiment, a first method for servicing read commands in a disc drive (such as 100) includes the steps of: receiving in the disc drive a read command requesting data (such as 314); determining that a disc write operation is in progress in the disc drive (such as 318); and discontinuing the disc write operation (such as 406, 506, 608, and/or 708) to service the read command (such as 320 and 322).

In accordance with this method, discontinuing the disc write operation may comprise aborting the disc write operation (such as 406 or 608). In such a case, the step of discontinuing the disc write operation may comprise determining if the disc write operation is to be aborted (such as 402 or 606) and, if it is determined that the disc write operation is to be aborted, aborting the disc write operation (such as 406 or 608) to service the read command (such as 320 and 322).

Alternatively, in accordance with this method, discontinuing the disc write operation may comprise interrupting (such as 506 or 710) the disc write operation. In such a case, the step of discontinuing the operation may include determining an optimal point during the disc write operation to interrupt the disc write operation (such as 504 or 704) and then interrupting the disc write operation at the optimal point (such as 506 or 710). Additionally, where discontinuing the disc write operation comprises interrupting the disc write operation, determining an optimal point during the disc write operation to interrupt the disc write operation may comprise using a rotationally optimized seek initiation (ROSI) algorithm (such as 704) to determine the optimal point during the disc write operation to interrupt the disc write operation.

In accordance with another embodiment, a method for managing read commands and write operations in a disc drive (such as 100) comprises steps of: receiving a read command in the disc drive (such as 314); determining that a disc write operation is occurring in the disc drive (such as 318); determining if the disc write operation is to be discontinued to service the read command (such as 402, 502, 606, or 704); and discontinuing the disc write operation to service the read command, if it is determined in determining step (c) that the disc write operation is to be discontinued (such as 406, 506, 608, or 710).

In accordance with this method, the a disc write operation may comprise reading data from a write cache in the disc drive (such as 210) and writing the data read from the write cache to specified data sectors of the disc drive. In accordance with this method, the determination as to whether the disc write operation is to be discontinued to service the read command may include determining a time (T1) required to complete the disc write operation and to access a predetermined sector in the disc drive associated with the read command; (such as 602) and determining a time (T2) required to access the predetermined sector if the disc write operation is discontinued (such as 604). Once these to time values T1 and 12 are known, a determination may then be made as to whether the disc write operation is to be discontinued, based on these time values (such as 606).

In accordance with another embodiment, a disc drive (such as 100) comprises a disc (such as 108) on which data associated with a disc write operation are written and from which data associated with a read command are read. In accordance with this embodiment, the disc drive also includes write discontinuation means in the disc drive for discontinuing a disc write operation to service a read command (such as 400, 500, 600, or 700).

It will be clear that the present invention is well adapted to attain the ends and advantages mentioned as well as those inherent therein. While a presently preferred embodiment has been described for purposes of this disclosure, various changes and modifications may be made that are well within the scope of the present invention. For example, while the various embodiments of the present invention are described herein particularly with respect to disc drives, it will be understood to those skilled in the art that the methods and systems described herein are also applicable to other types of data storage devices. Furthermore, many of the operations shown and described with respect to operational flows 400, 500, 600, and 700 may be combined with one another and/or substituted with one another to accomplish the function of determining if a disc write operation should be interrupted to service a read operation, and/or to determine an optimal point to discontinue the disc write operation if it is determined that the disc write operation should be discontinued. Numerous other changes may be made that will readily suggest themselves to those skilled in the art and that are encompassed in the spirit of the invention disclosed and as defined in the appended claims.

What is claimed is:

1. A method for servicing read commands in a disc drive, comprising steps of:
   (a) receiving in the disc drive a read command requesting data;
   (b) determining that a disc write operation is in progress in the disc drive; and
   (c) discontinuing the disc write operation to service the read command, wherein the discontinuing step (c) comprises step of:
      (c)(1) determining if the disc write operation is to be aborted, wherein the determining step (c)(1) comprises steps of:
         (c)(1)(a) determining a time (TR) required to complete the disc write operation and to access the data requested in the read command;
         (c)(1)(b) comparing TR with a specified time period (TS); and
         (c)(1)(c) if TR is greater than TS, determining that the write operation is to be aborted; and
      (c)(2) if it is determined that the disc write operation is to be aborted, interrupting the disc write operation to service the read command.

2. A method as defined in claim 1, wherein the disc write operation comprises writing data read from a write cache of the disc drive to data sectors on a disc of the disc drive.

3. A method as defined in claim 2, wherein the step
   (c)(1)(b) further comprises determining a value of TS corresponding to an optimal point during the disc write operation to interrupt the disc write operation; and
   the step (c)(2) further comprising interrupting the disc write operation at the optimal point.

4. A method as defined in claim 3, wherein the optimal point comprises a specified data sector of the disc drive.

5. A method as defined in claim 3, wherein the optimal point comprises a specified servo sector of the disc drive.

6. A method as defined in claim 3, wherein the determining step (c)(1) further comprises using a rotationally optimized seek initiation (ROSI) algorithm to determine the optimal point during the disc write operation to interrupt the disc write operation.

7. A disc drive comprising:
   a disc on which data associated with a disc write operation are written and from which data associated with a read command are read; and
   a write discontinuation means in the disc drive for discontinuing a disc write operation in progress in the disc drive to service a read command, wherein the write discontinuation means is operable to determine an optimal point at which to discontinue the disc write operation to service the read command.

8. A disc drive as defined in claim 7 wherein the optimal point comprises a data sector on the disc of the disc drive.

9. A disc drive as defined in claim 7, wherein the optimal point comprises a servo sector on the disc of the disc drive.

10. A disc drive as defined in claim 7, wherein discontinuing the disc write operation comprises aborting the disc write operation.

11. A disc drive as defined in claim 7, wherein discontinuing the disc write operation comprises interrupting the disc write operation.

12. A disc drive as defined in claim 7, wherein the disc drive further comprises a write cache in which data associated with the disc write operation are stored prior to being written to the disc.

13. A disc drive as defined in claim 12, wherein the write discontinuation means further comprises means for reestablishing in the write cache data associated with the disc write operation that was not written to the disc due to the discontinuation of the disc write operation.

14. A disc drive as defined in claim 12, wherein the write discontinuation means determines an optimal point at which to discontinue the disc write operation using a rotationally optimized seek initiation (ROSI) algorithm.

15. A disc drive as defined in claim 12, wherein the write discontinuation means determines a time (T1) required to complete the disc write operation and to access a predetermined location on the disc associated with the read command, is operable to determine a time (T2) required to access the predetermined location on the disc without completing the disc write operation, and is operable to determine an optimal point at which to discontinue the disc write operation using T1 and T2.

16. A disc drive as defined in claim 7, wherein the disc drive further comprises a control means executing computer executable code for controlling the operation of the disc drive and wherein the write discontinuation means comprises computer executable code executed by the control means.

17. A system comprising:
   a cache coupled to a communication channel to receive and store data until the data is transferred to a data storage medium;
   a processor coupled to the cache; and
   a memory for storing program instructions that, when executed by the processor, cause the processor to perform operations to process pending commands associated with data stored in the cache, the operations comprising:
      initiate a first operation to service a pending first command to transfer data that is stored in the cache;
      determine an optimum point at which to service the second command if a second command of higher priority than the pending first command is received while the first operation is executing; and
      interrupt the first operation at or before the optimum point.

18. The system of claim 17, wherein the operation to determine the optimum point comprises:
   use a rotationally optimized seek initiation (ROSI) algorithm to determine the optimum point during the pending first operation to service the pending second command.

19. The system of claim 17, wherein the first operation is a write operation to store data that is stored in the cache to a data storage medium, and the first command is a write command that is associated with the write operation.

20. The system of claim 19 wherein the second command is a read command that is associated with a read operation to receive data that is stored on a data storage medium.

21. The system of claim 20, wherein the operations further comprise:
   when the read command is no longer pending, resume the interrupted write operation by writing data stored in the cache that has not yet been written to a data storage medium.

22. The system of claim 20, wherein the operation to determine the optimum point comprises:
   1) calculate a time (T1) indicative of the time required to service the read command if the write operation is completed before servicing the read command; and
   2) calculate a time (T2) indicative of the time required to service the read command if the write operation is interrupted to service the read command, wherein the time required to service the read command includes an estimate of the time required for a read transducer to be positioned to read the first sector of data associated with the pending read command.

23. The system of claim 22, wherein the optimum point at which to interrupt the pending read command is determined as a function of T1 and T2.

24. The system of claim 17, wherein the data storage medium comprises one or more discs in a disc drive.

25. The system of claim 17, wherein the memory for storing program instructions comprises non-volatile memory.

* * * * *